US007387054B2

(12) United States Patent
Rajotte

(10) Patent No.: US 7,387,054 B2
(45) Date of Patent: Jun. 17, 2008

(54) SCREW DRIVING DEVICE

(76) Inventor: Jacques Rajotte, 1206 Columbia St., Hood River, OR (US) 97031

( * ) Notice: Subject to any disclaimer, the term of this patent is extended or adjusted under 35 U.S.C. 154(b) by 0 days.

(21) Appl. No.: 11/363,951

(22) Filed: Mar. 1, 2006

(65) Prior Publication Data

US 2007/0204730 A1 Sep. 6, 2007

(51) Int. Cl.
*B25B 23/00* (2006.01)
*B23B 5/22* (2006.01)
*B25G 3/02* (2006.01)

(52) U.S. Cl. ............................... 81/429; 81/438; 279/75

(58) Field of Classification Search ................... 81/429, 81/438, 451, 125; 279/22, 75, 30, 905
See application file for complete search history.

(56) References Cited

U.S. PATENT DOCUMENTS 3,767,218 A * 10/1973 Linthicum et al. ............ 279/75
4,287,923 A 9/1981 Hornung
4,753,142 A 6/1988 Hornung
5,188,378 A * 2/1993 Erlenkeuser ................. 279/22
5,996,452 A * 12/1999 Chiang ........................ 81/429
6,192,776 B1 * 2/2001 Leitner ........................ 81/429
6,199,872 B1 * 3/2001 Hasan ......................... 279/30
6,364,318 B1 * 4/2002 Bedi et al. .................... 279/22
6,543,959 B1 * 4/2003 Jore ........................... 279/75
6,637,755 B2 * 10/2003 Chen et al. .................... 279/22
6,931,967 B1 * 8/2005 Chang ......................... 81/125
7,086,313 B2 * 8/2006 Cantlon ....................... 81/438
7,175,185 B2 * 2/2007 Chen .......................... 279/75

OTHER PUBLICATIONS

DeWalt® Adjustable Screw Depth Setter, Model DW2043; as shown in the accompanying literature describing and depicting same. Date unknown but before Mar. 1, 2006.

* cited by examiner

*Primary Examiner*—Hadi Shakeri
(74) *Attorney, Agent, or Firm*—Stites & Harbison PLLC; Marvin Petry

(57) ABSTRACT

A screw driving device is provided which can counter-sink a screw at angles off of normal from a workpiece. The device includes a shank held in contact with a screw bit to drive the tip when a plurality of balls are held in contact between a screw bit head and a sleeve surrounding the shank and to disengage the shank from the bit when the screw is at a desired counter-sunk depth. The disengagement of the shank from the screw bit is provided by permitting the plurality of balls to slide out of contact between the rotating shank and bit to thus disengage the shank from the screw bit.

11 Claims, 3 Drawing Sheets

PRIOR ART

SCREW DRIVING DEVICE

FIELD OF THE INVENTION

The present invention relates to a device for driving screws, and in particular, a device for driving screws having a drive mechanism to countersink screws into a workpiece.

BACKGROUND OF THE INVENTION

Conventional devices for driving screws using a power tool such as a drill or the like are common in the art. These devices have a screwing head with a screw bit tip end which fits onto the head of a screw and a driveshaft end which is attached to the drive mechanism of the power tool. Recent advancements in screwing heads include devices with drive mechanisms which allow a screw to be counter-sunk at or below the surface of a workpiece. For example, the drive mechanism may include a clutch system in which a driveshaft is disengaged from the drive mechanism of the power tool to thereby stop the bit from turning when a desired counter-sinking depth is achieved. At the counter-sinking depth, the drive mechanism disengages from the screw bit thereby ceasing rotation of the screw bit, and likewise ceasing the turning of the screw. Examples of prior screwing heads includes the devices of U.S. Pat. Nos. 4,287,923 and 4,753,142.

One disadvantage of prior screwing heads is that the radius of the screwing head proximate the screw driving bit is relatively large. A relatively large screwing head limits the number of degrees off normal the screwing head can be from the workpiece and still completely counter-sink the screw. Specifically, the suitable angle at which the screw can be driven into a workpiece, relative to the surface of the workpiece, is determined by the radius of the screw head, the radius of the screwing device proximate the bit tip, and the counter-sink depth. If the angle is too great, as the screw enters the workpiece at an angle, the drive mechanism of the screwing head will disengage from the screw bit, resulting in part of the head of the screw remaining above the surface of the workpiece, and therefore not counter-sunk into the workpiece. Although it is preferable to direct or drive screws into a workpiece at an angle normal (perpendicular) to the workpiece, often a screw is not perfectly normal and may be at an angle relative to the workpiece. With conventional screw driving heads, which have relatively large radii, e.g. 7.00 to 8.50 mm, the maximum angle at which the screw can be relative to the workpiece is typically less than 6.5 degrees off normal, i.e. 83.5 degrees relative to the workpiece surface. Since, the maximum angle between the screw and the workpiece surface in order to completely counter-sink a screw is determined by the radius of the screw head, the radius of the screwing driving device proximate the tip end and the counter-sink depth, the relatively large screw driving head radii of prior screwing heads limits the angle at which a screw can be driven and counter-sunk into a workpiece.

Accordingly, there is a need in the art for a screwing head which permits a screw to be at an angle greater than 6.5 degrees off of normal and still be able to counter-sink the screw into a workpiece.

SUMMARY OF THE INVENTION

The present invention relates to a screw driving head which can accommodate driving a screw into a workpiece at angles off of normal and counter-sink the screw into the workpiece. The screw driving head accomplishes this with a device having a relatively smaller radius than conventional driving devices.

The present invention, in one form, is a device for driving screws comprising a shank having an end portion defined by a wall of annular cross-section defining a seat. The end portion terminates at an end surface. A plurality of radial bores are formed in the annular wall of the shank. A screw bit has a head end which is received in the seat of the shank and a driver end adapted to drive a screw. A sleeve surrounds at least a part of the end portion of the shank and is axially movable relative to the shank. The sleeve has a surface facing the shank with a plurality of recesses. The sleeve has a bottom surface with an aperture through which the screw bit is disposed. A spring is disposed between the end portion of the shank and the bottom of the sleeve to provide a biasing force between the shank and the sleeve. A plurality of balls are disposed in respective bores in the end portion of the shank. The balls are held in engagement with the screw bit head when the balls are in contact with a non-recess portion of the sleeve. The balls are movable in a radial direction away from the screw bit head into the recesses when the balls align with the recesses thereby disengaging contact with the screw bit head.

The present invention in another form thereof concerns a method for counter-sinking a screw into workpiece. The method includes inserting the head of screw onto a screw bit end of a counter-sinking screw driving device having a drive mechanism to permit the screw to be counter-sunk into a workpiece at/or below a surface thereof before disengaging a driveshaft from the screw bit. The threaded end of the screw is pressed into a workpiece with a shaft of the screw forming an angle with the workpiece surface between 90 degrees and at least less than 83.7 degrees. The counter-sinking device is activated to cause the bit end to rotate, and thereby drive the screw into the workpiece and counter-sink the screw so that the top surface of the head of the screw surface is at or at least slightly below the surface of the workpiece before the driveshaft disengages from the screw bit.

BRIEF DESCRIPTION OF THE DRAWINGS

A preferred embodiment of the present invention will now be described, by way of example, with reference to the accompanying drawings, in which.

Figure 1:
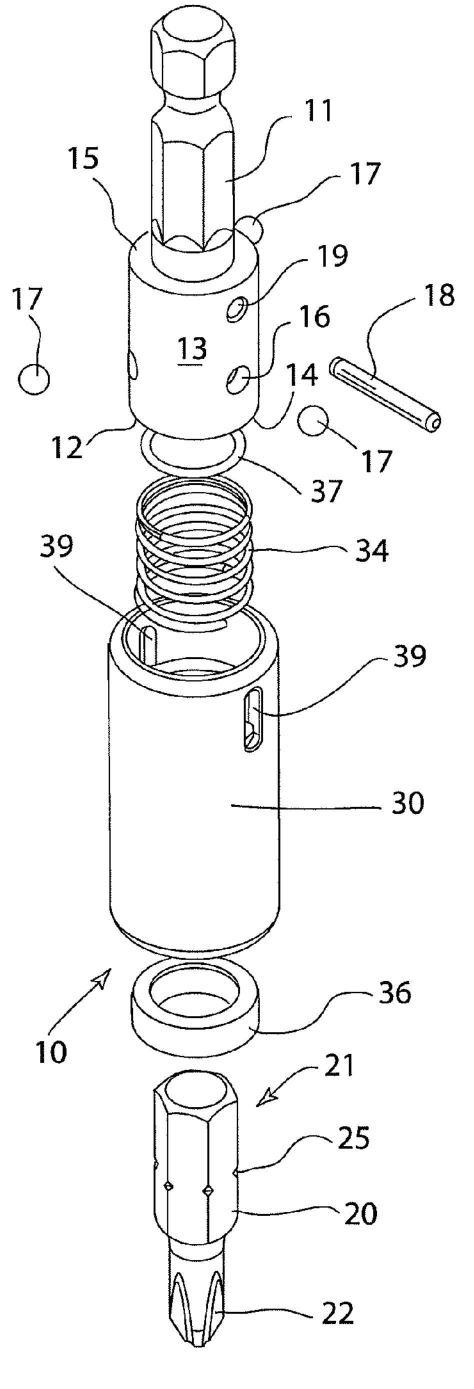
FIG. 1 is an exploded view of a screw driving device in accordance with the present invention.
Figure 2:
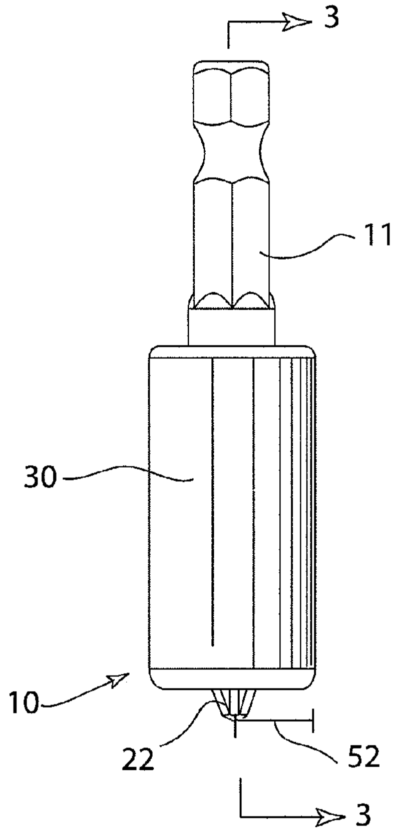
FIG. 2 is an elevational view of the screw driving device of FIG. 1.

FIG. *6a* is a schematic view of a prior screw driving device shown driving a screw into a wall surface workpiece and FIG. *6b* is a schematic view of the prior screw driving device shown driving a different screw into a wall surface; and FIG. *7a* is a schematic view showing a screw driving device in accordance with the present invention driving a screw into a wall surface and FIG. *7b* is a schematic view of the present driving device shown driving a different screw into a wall surface.

DETAILED DESCRIPTION

Now referring to the Figures in which like elements are numbered the same throughout the views, screw driving device 10 comprises a drive mechanism in the form of a shank

11 which has an end portion 12 with an annular wall 13, an end surface 14 and a top surface 15. A plurality of bores 16 are formed through annular wall 13. A respective one or a plurality of balls 17 are disposed in the bores 16.

Screw bit 20 has a head end 21 received in a seat portion 24 of the shank 11 defined by the annular wall 13. A screw bit tip 22 which is opposite the head end 21, is adapted to fit onto the head of a screw 40 to be driven.

Sleeve 30 surrounds the annular wall 13 of the shank 11 and a substantial portion of the screw bit 20 including head end 21, with the bit tip 22 extending through sleeve aperture 31. A plurality of recesses 32 are formed on an inner surface 33 of sleeve 30 which are of a sufficient size so that a respective one of the plurality of the balls 17 can slide into the recesses 32 and away from contact with screw bit head 21. A pin 18 is disposed through sleeve slots 39 and shank apertures 19 to lock the shank 11 with the sleeve 30.

Advantageously, radius 52 of the sleeve 30 proximate the bit tip 22 is less than 8 mm. This relatively small radius allows a screw to be completely countersunk into a workpiece even when directed into a workpiece at an angle off normal. Conversely, the larger radii of prior screwing devices prevents the complete countersinking of screws directed into a workpiece when the angle off normal is too great.

Figure 6A:
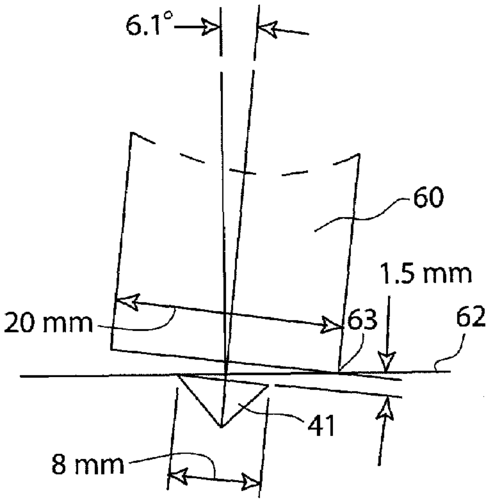
FIG. 6a PRIOR ART
Figure 6B:
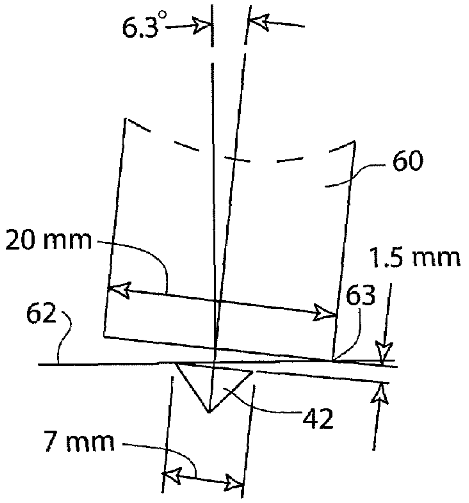

For example, referring to FIG. 6, and in particular, FIG. 6*a*, the relatively larger radius of prior device 60, with a diameter of 20 mm/radius of 10 mm, can countersink screw 41 with a screw head diameter of 8 mm into wall 62 from 90 degrees up to 83.9 degrees (6.1° off normal) relative to the wall surface before the exterior edge 63 contacts the wall. Referring to FIG. 6*b*, the prior device 60 can countersink screw 42 with screw head diameter of 7 mm into wall 62 from 90 degrees up to 83.7 degrees (6.3° off normal) relative to the wall surface before the exterior edge 63 contacts the wall. When driving screw 41 with a 8 mm head diameter, at angles greater than 83.9 degrees, the exterior edge 63 will contact wall 62 prior to fully countersinking the screw 41 at or below the surface of wall 62, resulting in a portion of the screw 41 being above the surface of the wall. Similarly, when driving screw 42 with a 7 mm head diameter, at angles greater than 83.7 degrees, the exterior edge 63 will contact wall 62 prior to fully countersinking the screw 42 at or below the surface of wall 62.

Figure 7A:
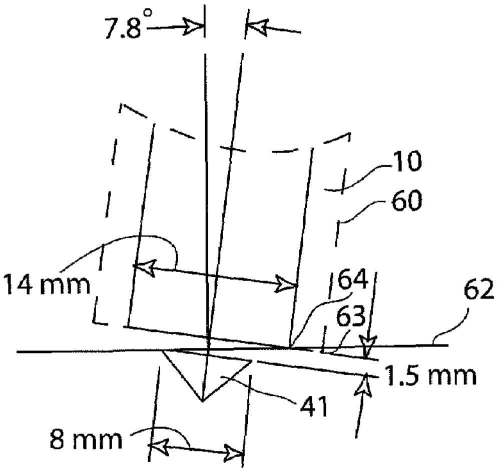
Figure 7B:
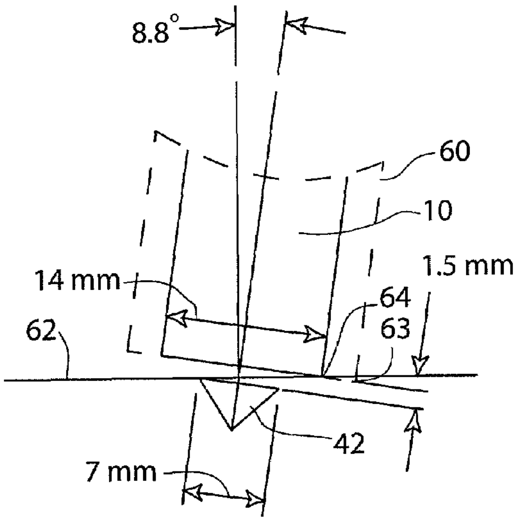

However, as shown in FIG. 7, the narrower screw driving device 10, with 14 mm diameter/7 mm radius, can countersink screws directed in a workpiece, such as wall 62, at angles from 90 degrees up to 82.2 degrees (7.8° off normal) when driving screw 41 with a 8 mm screw head and from 90 degrees up to 81.2 degrees (8.8° off normal) when driving screw 42 with a 7 mm screw head diameter. As a result, the screw driving device 10 can countersink screw 41 directed at a workpiece at an angle up to 82.2 and screw 42 directed at an angle up to 81.2 degrees since edge 64 will not contact wall 62 before the head of the respective screw 41, 42 has been countersunk. Conversely, the prior device 60 with 20 mm diameter/10 mm radius, shown in FIGS. 7*a* and 7*b* as a broken line, cannot countersink screw 41 when directed at an angle over 83.9° as its exterior edge 63 will contact the wall 62 before the head of screw 41 is countersunk. Likewise, prior device 60 cannot countersink screw 42 directed at an angle over 83.7 degrees as edge 63 will contact wall 62 before countersinking screw 42.

Referring back to FIGS. 1-5, a spring such as coil spring 34 is located between the shank bottom 14 and a sleeve bottom inner surface 35, with the screw bit 20 being disposed through the center of a coil formed by the spring 34. The spring 34 provides a biasing force between the shank 11 and the sleeve 30. A magnet 36 is located at the bottom of 31 near the tip 22 to magnetize the tip 22 so that a screw 40 comprised of a suitable magnetic metal will be attracted to and remain magnetically affixed to the tip 22 when placed thereon. A retainer clip 37 is disposed in tip notches 25 and shank groove 38 to retain the screw bit 20 in the seat 24.

Figure 3:
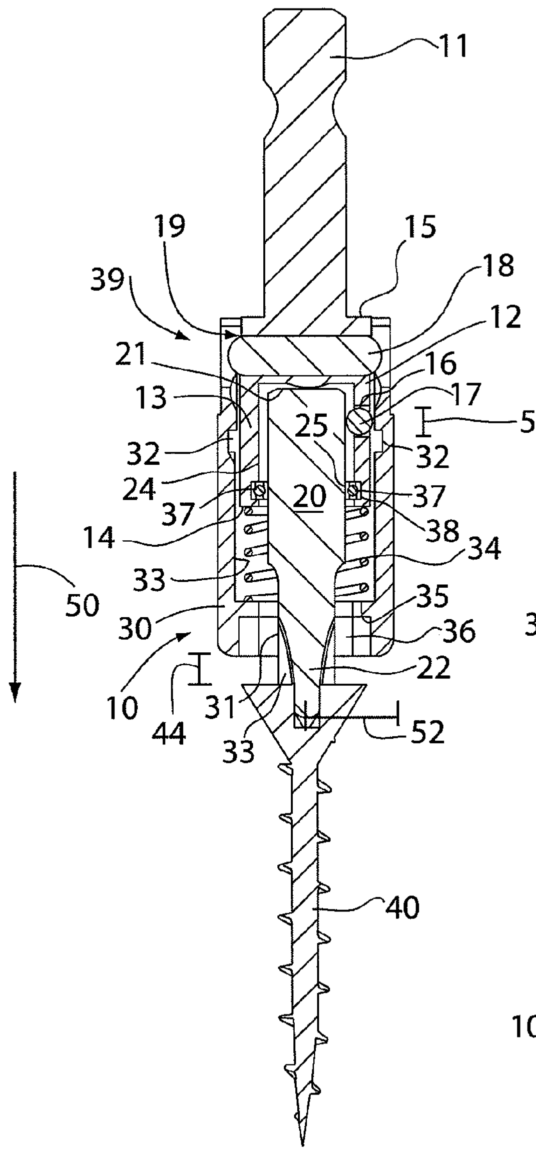
FIG. 3 is a cross-sectional view of the device of FIG. 1 taken along line 3-3 of FIG. 2 with the device shown in a screw driving engagement configuration.

The present screw driver device 10 is designed to fit on the end of a drill or other power tool which provides rotational motion to shank 11. In use, a user inserts the head of a screw 40 onto tip 22, magnetized by magnet 36. Spring 34 biases the shank 11 relative to the tip 20 so that balls 17 are in tight contact between the bit head 21 and the inner surface 33 of sleeve 30, thus defining the driving engagement configuration of device 10 (FIG. 3). Since, the plurality of balls 17 are held in contact with both the bit head 21 and the inner sleeve surface 33, rotational force applied to shank 11 will turn tip 22 and thus turn screw 40.

Figure 4:
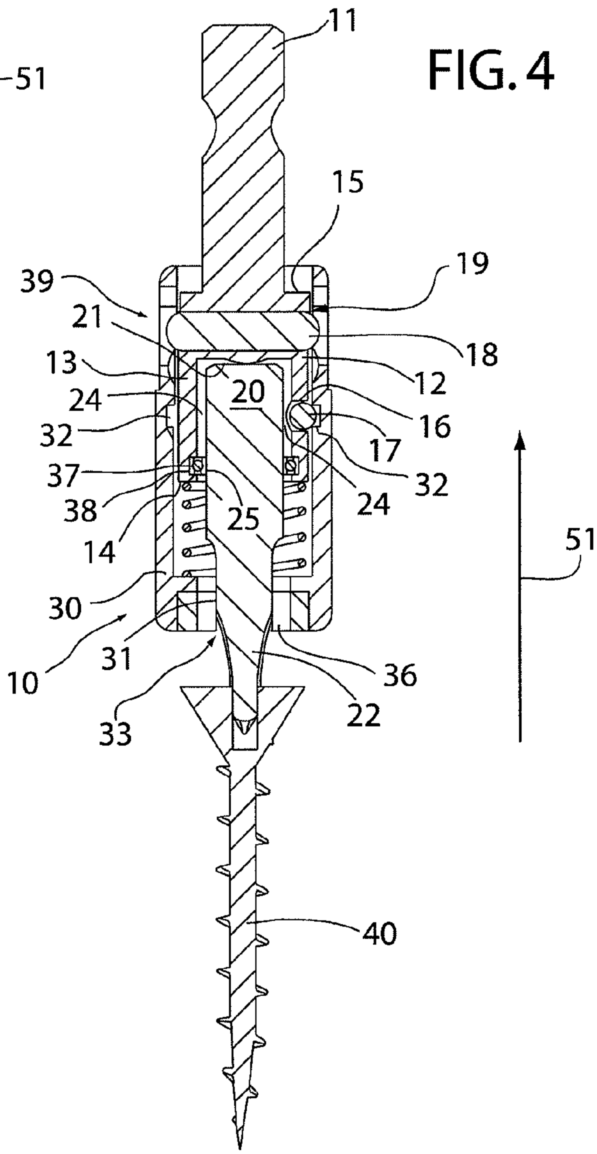
FIG. 4 is a cross-sectional view of the device similar to FIG. 3 but showing a disengaged, non-driving configuration.
Figure 5:
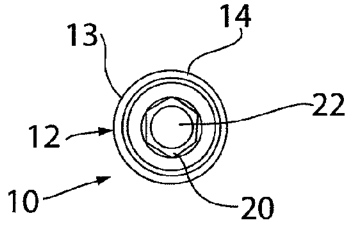
FIG. 5 is a plan view of the device of FIG. 2, viewed from below.

A user then presses the threaded tip end of screw 40 attached to the device into the surface of a workpiece in the direction of arrow 50. Subsequently, the drill or power tool is activated to cause shank 11 to rotate and thus screw the screw 40 into the workpiece. Once the device has reached a desired depth defined by the length 44 and the distance 51 defined by the distance between balls 17 and recesses 32 when the device 10 is at rest, force applied to shank 11 acts against the biasing force of spring 34 to urge the shank 11 in the direction 50, eventually resulting in the plurality of balls 17 being moved into recesses 32 and thus away from screw bit head 21. As a result, screw bit 20 disengages from the drive mechanism of shank 11, and the device is transformed into a disengaged configuration (FIG. 4). When the device 10 is withdrawn from the workpiece in a direction 51, the spring 34 forces the shank 11 away from the sleeve 30 which results in the plurality of balls 17 moving away from recesses 32 and again in contact with head 21 and inner sleeve surface 33, re-establishing connectivity or driving engagement between shank 11 and screw bit 20. As a result, the device is transformed back into the engagement or driving configuration.

As noted, the depth a screw will be countersunk into a workpiece is defined by the length 44 of the portion of tip 22, i.e. the distance between the bottom of the sleeve 30 and the top of the top surface of the head of the screw to be driven, and distance 51, defined by the distance the balls 17 traverse when the device 10 is transformed from the driving configuration to the disengaged configuration. Therefore, the countersunk depth can be varied by replacing the screw bit 20 with a screw bit which is longer, resulting in a deeper countersinking depth or a screw bit which is shorter, resulting in a more shallow countersinking depth. Screw bits are interchangeable with device 10 by withdrawing the existing screw bit 20 which is held in place by retainer clip 37, and inserting a new screw bit through sleeve aperture 31, until the new screw bit is engaged with retainer clip 37.

Alternatively, the depth a screw will be countersunk into a workpiece can be varied by replacing the sleeve 30 with one which is longer or shorter, or contains a longer or shorter screw bit. Sleeve 30 is replaceable by removing pin 18, withdrawing the sleeve 30, inserting a second sleeve, and replacing the pin 18.

It will now be clear to one of ordinary skill in the art that the present device has advantages not found in previous countersinking screw driver devices. The relatively small radius allows a screw to be completely countersunk into a workpiece even when directed into a workpiece at an angle off normal. The relatively narrow radius allows the driver to be at an angle relative to a workpiece of between 90 degrees and at least 82.2 degrees and more preferably at least 81.2 degrees, while completely countersinking the screw at or below the surface of the workpiece. Specifically, the more narrow radius means that the bottom of the sleeve 30, proximate the bit tip 22 will not impede the counter-sinking of a screw by disengaging the shaft 11 from screw bit 20 when a device is at an angle off normal to a workpiece up to at least 81.2 degrees. Since, the maximum angle at which the device can be off normal relative to a workpiece is defined by the radius 52 of the device and by the radius of the screw head, a screw having a more narrow screw head radius will allow the present device to countersink the screw at increasing angles off of normal from a workpiece.

Further, the smaller radius 52 is accomplished, in part, by arranging the spring 34 below the shank bottom 12 and around the screw bit 20, thus allowing for a reduction in the radius of the device relative to prior devices such as the one of the U.S. Pat. No. 4,753,142.

Although the invention has been described above in relation to preferred embodiments thereof, it will be understood by those skilled in the art that variations and modifications can be effected in these preferred embodiments without departing from the scope and spirit of the invention.

The invention claimed is:

1. A device for driving screws comprising:

a shank having an end portion defined by a wall of annular cross-section defining a seat, said end portion terminating at an end surface, a plurality of radial bores formed in said wall;

a screw bit having a head end received in said seat and a driver end adapted to drive a screw;

a sleeve surrounding at least part of said end portion of said shank and axially movable, relative to said shank, said sleeve having a surface facing said shank with a plurality of recesses, said sleeve having a bottom surface with an aperture through which said screwdriver bit is disposed;

a spring disposed between said end portion of said shank and said bottom of said sleeve to provide a biasing force between said shank and said sleeve, wherein said spring is disposed between said end surface of said shank and said bottom portion of said sleeve; and a plurality of balls disposed in respective bores in said end portion of said shank, said balls held in engagement with said screw bit head when said balls are in contact with a non-recess portion of said sleeve, said balls movable in a radial direction away from said screwdriver bit head into said recesses when said balls align with said recess, thereby disengaging contact with said screw bit head.

2. The device of claim 1, wherein the radius of said sleeve at said bottom is no greater than 8 mm.

3. The device of claim 1, wherein the radius of said sleeve at said bottom is sufficiently small to permit said device to countersink a screw in a workpiece when said device is at an angle of at least 7.8° off normal from a surface of said workpiece.

4. The device of claim 1, wherein the radius of said sleeve at said bottom is sufficiently small to permit said device to countersink a screw in a workpiece when said device is at an angle greater than 6.3° off normal from a surface of said workpiece.

5. The device of claim 1, wherein said spring comprises a coil spring encircling at least a portion of said bit.

6. The device of claim 1, wherein the spring is disposed between said end surface of said shank and an inner bottom surface of said sleeve.

7. The device of claim 1, wherein the spring is operatively associated with the end portion of the shank which is proximate the end surface.

8. The device of claim 1, wherein the spring is operatively associated with the end surface of the shank.

9. The device of claim 1, wherein the spring has an outside radius no greater than an outside radius of the shank.

10. A device for driving screws comprising:

a shank having an end portion defined by a wall of annular cross-section defining a seat, said end portion terminating at an end surface, a plurality of radial bores formed in said wall;

a screw bit having a head end received in said seat and a driver end adapted to drive a screw;

a sleeve surrounding at least part of said end portion of said shank and axially movable, relative to said shank, said sleeve having a surface facing said shank with a plurality of recesses, said sleeve having a bottom surface with an aperture through which said screwdriver bit is disposed;

a spring disposed between said end portion of said shank and said bottom of said sleeve to provide a biasing force between said shank and said sleeve, wherein the spring is disposed between said end surface of said shank and an inner bottom surface of said sleeve; and a plurality of balls disposed in respective bores in said end portion of said shank, said balls held in engagement with said screw bit head when said balls are in contact with a non-recess portion of said sleeve, said balls movable in a radial direction away from said screwdriver bit head into said recesses when said balls align with said recess, thereby disengaging contact with said screw bit head.

11. A device for driving screws comprising:

a shank having an end portion defined by a wall of annular cross-section defining a seat, said end portion terminating at an end surface, a plurality of radial bores formed in said wall;

a screw bit having a head end received in said seat and a driver end adapted to drive a screw;

a sleeve surrounding at least part of said end portion of said shank and axially movable, relative to said shank, said sleeve having a surface facing said shank with a plurality of recesses, said sleeve having a bottom surface with an aperture through which said screwdriver bit is disposed;

a spring disposed between said end portion of said shank and said bottom of said sleeve to provide a biasing force between said shank and said sleeve, wherein the spring has an outside radius no greater than an outside radius of the shank; and a plurality of balls disposed in respective bores in said end portion of said shank, said balls held in engagement with said screw bit head when said balls are in contact with a non-recess portion of said sleeve, said balls movable in a radial direction away from said screwdriver bit head into said recesses when said balls align with said recess, thereby disengaging contact with said screw bit head.

* * * * *